(12) United States Patent
Fusi

(10) Patent No.: US 10,762,163 B2
(45) Date of Patent: Sep. 1, 2020

(54) PROBABILISTIC MATRIX FACTORIZATION FOR AUTOMATED MACHINE LEARNING

(71) Applicant: Microsoft Technology Licensing, LLC, Redmond, WA (US)

(72) Inventor: Nicolo Fusi, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 932 days.

(21) Appl. No.: 15/369,590

(22) Filed: Dec. 5, 2016

(65) Prior Publication Data

US 2018/0157971 A1    Jun. 7, 2018

(51) Int. Cl.
G06F 17/16        (2006.01)
G06N 7/00         (2006.01)

(52) U.S. Cl.
CPC ............. *G06F 17/16* (2013.01); *G06N 7/005* (2013.01)

(58) Field of Classification Search
CPC . G06N 7/005; G06N 3/04; G06N 3/08; G06F 17/16
USPC .......................................................... 706/12
See application file for complete search history.

(56) References Cited

U.S. PATENT DOCUMENTS

| 8,190,549 B2 | 5/2012 | Yang et al. | |
| 2015/0088953 A1* | 3/2015 | Koduvely | G06K 9/6249 708/520 |
| 2016/0012088 A1* | 1/2016 | Rossi | G06Q 30/02 707/736 |

(Continued)

FOREIGN PATENT DOCUMENTS

| WO | 2013012990 A1 | 1/2013 |
| WO | 2015184627 A1 | 12/2015 |
| WO | 2015184729 A1 | 12/2015 |

OTHER PUBLICATIONS

Lawrence et al., "Non-linear Matrix Factorization with Gaussian Processes", Appearing in Proceedings of the 26th International Conference on Machine Learning, Montreal, Canada, 2009. (Year: 2009).*

(Continued)

*Primary Examiner* — Dave Misir
(74) *Attorney, Agent, or Firm* — Schwegman Lundberg & Woessner, P.A.

(57) ABSTRACT

In embodiments of probabilistic matrix factorization for automated machine learning, a computing system memory maintains different workflows that each include preprocessing steps for a machine learning model, the machine learning model, and one or more parameters for the machine learning model. The computing system memory additionally maintains different data sets, upon which the different workflows can be trained and tested. A matrix is generated from the different workflows and different data sets, where cells of the matrix are populated with performance metrics that each indicate a measure of performance for a workflow applied to a data set. A low-rank decomposition of the matrix with populated performance metrics is then determined. Based on the low-rank decomposition, an optimum workflow for a new data set can be determined. The optimum workflow can be one of the different workflows or a hybrid of at least two of the different workflows.

18 Claims, 4 Drawing Sheets

(56) References Cited

U.S. PATENT DOCUMENTS

2016/0125316 A1    5/2016  Kadav et al.
2016/0132787 A1*   5/2016  Drevo ............... G06N 20/00
                                                         706/12

OTHER PUBLICATIONS

Kim et al., "Convolutional Matrix Factorization for Document Context-Aware Recommendation", RecSys'16, Sep. 15-19, 2016, Boston, MA, USA. (Year: 2016).*

Wang, et al., "A Probabilistic Approach to Robust Matrix Factorization", In Proceedings of 12th European Conference on Computer Vision, Oct. 13, 2012, pp. 1-14.

Wang, et al., "Efficient Hyper-parameter Optimization for NLP Applications", In Proceedings of the Conference on Empirical Methods in Natural Language Processing, Sep. 17, 2015, pp. 2112-2117.

Levesque, et al., "Bayesian Hyperparameter Optimization for Ensemble Learning", In Proceedings of the Thirty-Second Conference on Uncertainty in Artificial Intelligence, Jun. 25, 2016, 10 pages.

Salakhutdinov, et al., "Bayesian Probabilistic Matrix Factorization using Markov Chain Monte Carlo", In Proceedings of the 25th International Conference on Machine Learning, Jul. 5, 2008, 8 pages.

Sabharwal, et al., "Selecting Near-Optimal Learners via Incremental Data Allocation", In Proceedings of the Thirtieth AAAI Conference on Artificial Intelligence, Feb. 17, 2016, 9 pages.

Chan, et al., Continuous Hyperparameter Optimization for Large-scale Recommender Systems, In Proceedings of IEEE International Conference on Big Data, Oct. 6, 2013, 9 pages.

Gantner, et al., "Learning Attribute-to-Feature Mappings for Cold-Start Recommendations", In Proceedings of IEEE 10th International Conference on Data Mining, Dec. 13, 2010, 10 pages.

Ardehaly, et al., "Cold-Start Recommendations for Audio News Stories Using Matrix Factorization", In Proceedings of the Twenty-Fifth International Joint Conference on Artificial Intelligence, Jul. 9, 2016, pp. 1375-1381.

Zhang, et al., "FLASH: Fast Bayesian Optimization for Data Analytic Pipelines", In Proceedings of the 22nd ACM SIGKDD International Conference on Knowledge Discovery and Data Mining, Aug. 13, 2016, pp. 1-21.

Silva, et al., "Active Learning for Online Bayesian Matrix Factorization", : In Proceedings of the 18th ACM SIGKDD international conference on Knowledge discovery and data mining, Aug. 12, 2012, 9 pages.

Snoek, et al., "Scalable Bayesian Optimization Using Deep Neural Networks", In Proceedings of the 32nd International Conference on Machine Learning, Jul. 6, 2015, 13 pages.

Poloczek, et al., "Warm Starting Bayesian Optimization", In Publication of arXiv preprint arXiv:1608.03585, Aug. 11, 2016, pp. 1-18.

Feurer, et al., "Efficient and Robust Automated Machine Learning", In Journal of Advances in Neural Information Processing System, Dec. 7, 2015, pp. 1-9.

Feurer, et al., "Initializing Bayesian Hyperparameter Optimization via Meta-Learning", In Proceedings of the Twenty-Ninth AAAI Conference on Artificial Intelligence, Jan. 25, 2015, pp. 1128-1135.

* cited by examiner

PROBABILISTIC MATRIX FACTORIZATION FOR AUTOMATED MACHINE LEARNING

BACKGROUND

In computing environments, machine learning is often used in order to predict an output based on an input using knowledge or intelligence garnered from training. In order to apply machine learning to real-world problems, conventional approaches require many complex procedures with multiple steps. For example, input data often undergoes multiple preprocessing steps before features are extracted from the input data and processed. These normalized features are then used to train and test one or more machine learning algorithms, after which parameters of the machine learning algorithms are fine-tuned and the predicted outputs of multiple machine learning algorithms can ultimately be combined using an ensemble method. At each stage from the preprocessing to the ensembling, conventional machine learning approaches require an experienced data scientist to determine and prioritize which method, algorithm, and parameter setting to test next. Given the vast number of preprocessing procedures, algorithms, and possible parameters involved with applying machine learning to a real-world problem, conventional techniques often produce sub-optimal machine learning workflows.

SUMMARY

This Summary introduces features and concepts of probabilistic matrix factorization for automated machine learning, which is further described below in the Detailed Description and/or shown in the Figures. This Summary should not be considered to describe essential features of the claimed subject matter, nor used to determine or limit the scope of the claimed subject matter.

Probabilistic matrix factorization for automated machine learning is described. In embodiments, multiple data sets and multiple workflows are received. A computing system includes a memory to maintain different workflows and data sets for use in automated machine learning. The received data sets can be diverse and vary with respect to one another, such that data of one received data set is not generally comparable to or congruent with data of another received data set. Similarly, the different workflows can represent a wide range of approaches to applying machine learning to a real-world problem. In order to determine how different workflows perform when they are applied to different data sets, the computing system generates a matrix using the multiple workflows and multiple data sets, where each row of the matrix represents a different workflow and each column of the matrix represents a different data set.

After generating the matrix, at least one of the multiple workflows is selected to be trained and tested on a data set. Each selected workflow is then applied to the data set, and a performance metric of the workflow applied to the data set is determined and recorded in a cell of the generated matrix. The workflow performance metric may be any suitable measure of the workflow's performance, such as an accuracy, a measure of accuracy stated as an area under a receiver operating characteristic curve (AUROC or AUCROC), a measure of runtime to complete stated as seconds or minutes, a root mean squared error (RMSE), and the like. This selection of at least one workflow and application of the selected workflow(s) to a data set is repeated for any number of different data sets represented in the matrix. In implementations, the computational time and cost for applying every workflow to every data set quickly becomes unmanageable for larger matrices. Accordingly, the matrix may only be sparsely populated with workflow performance metric values in its cells after the selected workflows are applied to individual data sets.

After the workflow performance metrics are recorded in the matrix, a low-rank decomposition of the matrix is determined. This low-rank decomposition of the matrix is then useable to predict the performance of each workflow as applied to a new data set. The low-rank decomposition identifies maximally dissimilar workflows from the generated matrix, which can then be included in a stacked ensemble for subsequent testing on a new data set. Additionally, from this low-rank decomposition, a predicted performance of a hybrid workflow on a new data set can be determined by interpolating between predicted performance values of different workflows applied to the new data set.

Upon receiving a new data set, a predicted performance of the multiple workflows can be determined based on the low-rank decomposition of the matrix. In implementations, this predicted performance is represented as a posterior distribution of predicted performance of the multiple workflows. From this posterior distribution, an optimum workflow is selected for the new data set. In implementations, the optimum workflow can be identified based on an expected improvement of the workflow, an expected improvement per unit of time of the workflow, a probability of improvement of the workflow, and so on. The optimum workflow is then used to generate predicted outputs from the new data set, thereby mitigating the need to apply multiple different workflows to the new data set.

BRIEF DESCRIPTION OF THE DRAWINGS

Embodiments of probabilistic matrix factorization for automated machine learning are described with reference to the following Figures. Entities represented in the figures may be indicative of one or more entities and thus reference may be made interchangeably to single or plural forms of the entities in the discussion. The same numbers may be used throughout to reference like features and components that are shown in the Figures.

DETAILED DESCRIPTION

Figure 1:
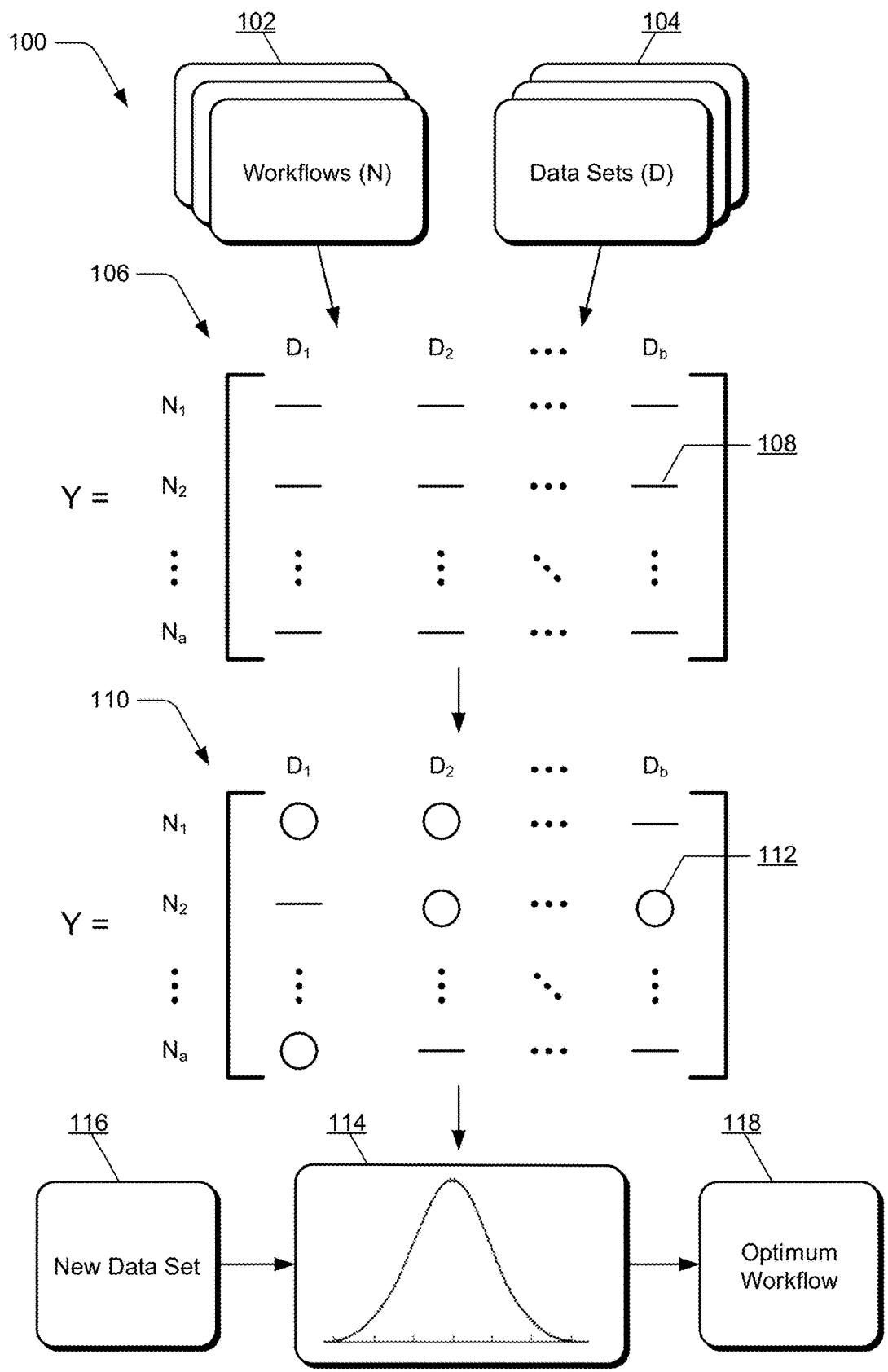
FIG. 1 illustrates an example of probabilistic matrix factorization for automated machine learning in accordance with one or more embodiments.

Embodiments of probabilistic matrix factorization are described for automated machine learning to identify an optimum workflow to apply to a new data set for generating predicted output values from the new data set. In implementations, multiple data sets and multiple workflows are received. As described herein, a received data set can include any type of information, such as an album of pictures. The received data sets can be diverse and vary with respect to one another, such that data of one received data set is not generally comparable to or congruent with data of another received data set. For example, one data set may be an album of pictures, another data set may be quarterly sales figures for a business, and so on. As described herein, a workflow refers to one or more preprocessing steps for a machine learning model, the machine learning model, and at least one parameter for the machine learning model or the one or more preprocessing steps.

As described herein, a machine learning model refers to any suitable type of machine learning method or algorithm, such as a deep neural network (DNN), a convolutional neural network (CNN), a random forest, and so on. Parameters for the machine learning model may include any suitable parameters, such as parameters for a number of leaves of a tree structure, a depth of the tree structure, a number of latent factors in a matrix factorization, a learning rate, a number of hidden layers in a DNN, and so on. Parameters for the one or more preprocessing steps may include any suitable parameters, such as parameters for formatting, cleaning, sampling, and so on. Thus, the received workflows can represent a wide range of different approaches to applying machine learning to a real-world problem.

In many implementations, due to the vast amount of possible workflow configurations, cost restrictions make it impossible to apply each of the received workflows to each of the received data sets. For example, the received workflows may include a theoretically infinite number of workflows, each representing a different configuration of preprocessing steps, machine learning models, and at least one parameter for machine learning models or preprocessing steps. Likewise, there may be a theoretically infinite number of received data sets. Accuracy associated with predicting which workflow will perform best for a given data set is dependent on an amount of workflows and an amount of data sets that have been tested, thus it is advantageous to train and test as many workflows on as many data sets as possible. The techniques described herein enable prediction of an optimum workflow for a new data set based on training and testing of a subset of workflows on a subset of data sets.

In order to determine how different workflows perform when they are applied to different data sets, the computing system is configured to generate a matrix using the multiple workflows and multiple data sets, where each row of the matrix represents a different workflow and each column of the matrix represents a different data set. After generating the matrix from the received workflows and data sets, at least one of the multiple workflows is selected to be trained and tested on a data set. Each selected workflow is then applied to the data set, and a performance metric of the workflow applied to the data set is determined and recorded in a cell of the generated matrix. The matrix cell in which the workflow performance metric is recorded is defined by a row of the matrix corresponding to the selected workflow and a column of the matrix corresponding to the data set. The workflow performance metric may be any suitable measure of the workflow's performance, such as an accuracy, a measure of accuracy stated as an area under a receiver operating characteristic curve (AUROC or AUCROC), a measure of runtime to complete a workflow stated as seconds or minutes, a measure of runtime to complete stated as seconds or minutes, a root mean squared error (RMSE), and the like.

This selection of at least one workflow and application of the selected workflow(s) to a data set can be repeated for any suitable number of different data sets used to generate the matrix. In implementations, the computational time and cost for applying every workflow to every data set quickly becomes unmanageable for larger matrices. Accordingly, the matrix may only be sparsely populated with workflow performance metric values in its cells after the selected workflows are applied to individual data sets.

After the workflow performance metrics are recorded in corresponding cells of the matrix, a low-rank decomposition of the matrix is determined. This low-rank decomposition of the matrix is then useable to predict the performance of each workflow as applied to a new data set. The low-rank decomposition may be performed by any suitable method. For example, the low-rank decomposition may be performed using a probabilistic non-linear low-rank decomposition, using dimensionality reduction techniques based on Gaussian processes, and so on. This low-rank decomposition can also be used to identify maximally dissimilar workflows from the generated matrix, which can then be included in a stacked ensemble for subsequent testing on a new data set. Additionally, from this low-rank decomposition, a predicted performance of a hybrid workflow on a new data set can be determined by interpolating between predicted performance values of different workflows applied to the new data set.

Upon receiving a new data set, a measure of performance of the multiple workflows can be determined based on the low-rank decomposition of the matrix. In implementations, this measure of performance may represent the accuracy of the multiple workflows, and is represented as a posterior distribution of predicted performance of the multiple workflows. From this posterior distribution, an optimum workflow is selected for the new data set. In implementations, the optimum workflow can be identified based on an expected improvement of the workflow, an expected improvement per unit of time of the workflow, a probability of improvement of the workflow, and so on.

Thus, by forming the approach as a matrix factorization problem, the techniques described herein are configured to identify an optimum workflow for a given data set, where the optimum workflow provides a maximized performance metric, among all received workflows, for the given data set. The optimum workflow is then useable to generate predicted outputs from the new data set, thereby mitigating the need to apply multiple different workflows to the new data set. The techniques described herein enable determining an optimum workflow to use on a given data set, even if the optimum workflow is a combination of multiple workflows or is a workflow that has not before been applied to the given data set.

While features and concepts of automated machine learning using probabilistic matrix factorization can be implemented in any number of different devices, systems, networks, environments, and/or configurations, embodiments of probabilistic matrix factorization for machine learning are described in the context of the following example devices, systems, and methods.

FIG. 1 illustrates an example system 100 in which multiple workflows 102 and multiple data sets 104 can be received and used to determine an optimum workflow for a new data set. Generally, a workflow 102 refers to one or more preprocessing steps for a machine learning model, the machine learning model, and at least one parameter for the machine learning model or the one or more preprocessing steps. A machine learning model as described herein can include any type of machine learning method or algorithm, such as a deep neural network (DNN), a convolutional neural network (CNN), a random forest, and so on. The received data sets can be diverse and vary with respect to one another, such that data of one received data set is not generally comparable to or congruent with data of another received data set.

The received workflows 102 and data sets 104 are used to generate an unpopulated matrix 'Y' 106. In the unpopulated matrix 106, individual rows represent a different one of the received workflows 102 and individual columns represent a different one of the received data sets 104. For example, the unpopulated matrix 106 represents a matrix generated using 'a' received workflows and 'b' received data sets, such that a resulting matrix is dimensioned a rows by b columns, or "a×b". Matrix 106 is "unpopulated" in that there are no values assigned to individual matrix cells, as indicated by the dash 108, which corresponds to a matrix cell for workflow $N_2$ applied to dataset $D_b$. Thus, each cell in the unpopulated matrix 106 corresponds to a unique pairing of a workflow and a data set. In the unpopulated matrix 106, each matrix cell is either empty or contains a null value indicating that the workflow of the cell has not been applied to the data set of the cell. In order to populate matrix cells with performance metrics, at least one of the multiple workflows 102 is selected to be trained and tested on one of the multiple data sets 104.

When a selected workflow 102 is applied to a data set 104, a performance metric of the workflow can be determined and recorded in a cell of the matrix Y. This selection of one or more workflows 102 and application of the selected workflow(s) to a data set 104 can be repeated for any subset of data sets 104, or for each of the multiple received data sets, to populate a matrix with cell values indicating performance metrics of workflows applied to data sets. The workflow performance metric may be any suitable measure of the workflow's performance as applied to the data set. For example, the workflow performance metric may be an accuracy, a measure of accuracy for the workflow stated as an AUCROC, a measure of runtime to complete the workflow, a root mean squared error (RMSE), and so on.

Populated matrix 'Y' 110 illustrates an example of the unpopulated matrix 106 that has been populated with workflow performance metric values in some of the matrix's cells. In the populated matrix 110, matrix cells that have been populated with a performance metric are illustrated by circles, such as the circle 112, which indicates that a performance metric has been determined from applying workflow $N_2$ to data set $D_b$. Thus, in the example system 100, populated matrix 110 includes performance metrics for workflows $N_1$ and $N_a$ applied to data set $D_1$, for workflows $N_1$ and $N_2$ applied to data set $D_2$, and for workflow $N_2$ applied to data set $D_b$. In implementations, because of the high computational cost associated with applying workflows to data sets, populated matrix 110 may be only sparsely populated with workflow performance metrics.

A low-rank decomposition of the populated matrix 110 is then determined. In implementations, the low-rank decomposition may be performed using a probabilistic non-linear low-rank decomposition of the populated matrix 110. Alternatively or additionally, the low-rank decomposition of the populated matrix 110 may be performed using dimensionality reduction techniques based on Gaussian processes. From this low-rank decomposition, maximally dissimilar workflows from the received workflows 102 can be determined and included in a stacked ensemble for subsequent testing on a different data set. In this manner, after testing and training the different data set on the stacked ensemble of workflows, the unpopulated matrix 106 and the populated matrix 110 can be updated to add a row corresponding to the workflow ensemble and a column corresponding to the different data set. Similarly, the populated matrix 110 can be updated with a workflow performance metric of the stacked ensemble of workflows applied to the different data set in a corresponding cell of the populated matrix.

Although described above as being applied to a different data set, a stacked ensemble of workflows may alternatively or additionally be applied to one of the received data sets 104 that is already listed in a column of matrices 106 and 110. In this example, only an additional row would be added for the stacked ensemble of workflows. Thus, the techniques described herein continuously update populated matrix 110 to reflect measured performance metrics from workflows applied to data sets. Accordingly, each additional entry in the populated matrix 110 iteratively improves the speed of convergence to identifying the optimum workflow for a given data set.

After determining the low-rank decomposition of the populated matrix 110, a predicted performance 114 of the multiple workflows 102 can be determined for a new data set 116. In implementations, the new data set 116 represents a data set not included in the multiple data sets 104. Alternatively, the new data set 116 may correspond to one of the multiple data sets 104. In implementations, this predicted performance 114 is represented as a posterior distribution of predicted performance of the multiple workflows. From this posterior distribution, an optimum workflow 118 is identified for the new data set. In implementations, the optimum workflow is identified based on an expected improvement of the workflow, an expected improvement per unit of time of the workflow, a probability of improvement of the workflow, and so on. Performance metrics from applying the optimum workflow 118 to the new data set 116 can then be measured and recorded in the populated matrix 110 using the techniques described herein, thereby providing improved predictive power in identifying an optimum workflow for subsequent new data sets.

Stated mathematically, the populated matrix 'Y' 110 can be represented as $Y \in \mathbb{R}^{N \times D}$, where Y contains the loss for N workflows and D data sets, and cells of Y include performance metrics for workflows applied to the data sets. The performance metric in a cell of Y can be one of an AUCROC, a root-mean-square error (RSME), an accuracy, a runtime, and so on. The optimum workflow 118 for a new data set 116 is sought in terms of a workflow that will maximize the performance metric for that new data set.

Having observed the performance of different workflows 102 on different data sets 104 and generating the populated matrix 110, a low-rank decomposition of the populated matrix is sought such that $Y \approx XW$, where $X \in \mathbb{R}^{N \times Q}$ and $W \in \mathbb{R}^{Q \times D}$. Q represents a dimension of a latent space in which the multiple workflows 102 and multiple data sets 104 can be jointly yielded. A low-rank decomposition of the populated matrix can be performed via probabilistic matrix factorization, as in Equation(1):

$$p(Y \mid X, W, \sigma^2) = \prod_{i=1}^{N} \mathcal{N}(y_i \mid x_i W, \sigma^2 \mathbb{I})$$

where $x_i$ is a row of X and $y_i$ is a vector of performance metrics for workflow i. $\mathcal{N}(x \mid \mu, \sigma^2)$ is the probability density function of the Gaussian distribution with mean $\mu$ and variance $\sigma^2$. Equation(1) represents a linear relationship between entries of Y and latent variables.

In order to apply Equation(1) to nonlinear probabilistic matrix factorization, the elements of Y are given by a nonlinear function of the latent variables. $y_{n,d}=f_d(x_n)+\in$, where $\in$ represents independent Gaussian noise. This provides a likelihood of the form as provided in Equation(2):

$$p(Y \mid X, f, \sigma^2) = \prod_{n=1}^{N}\prod_{d=1}^{D} \mathcal{N}(y_{n,d} \mid f_d(x_n), \sigma^2).$$

From Equation(2), a Gaussian Process prior is placed over $f_d(x_n)$, such that any vector $f$ is governed by a joint Gaussian density, $p(f|X)=\mathcal{N}(f|0, K)$, where K represents a covariance matrix, and the elements $K_{i,j}=k(x_i, x_j)$ encode the degree of correlation between two samples as a function of the latent variables. Selecting the covariance function $k(x_i, x_j)=x_i^T x_j$, which is a prior corresponding to linear functions, a model equivalent to probabilistic matrix factorization is recovered. The framework of Gaussian Process prior enables selection of a prior over non-linear functions. For example, this enables selection of a squared exponential covariance function with automatic relevance determination, which represents one lengthscale per dimension, stated as:

$$k(x_i, x_j) = \alpha\exp\left(-\frac{\gamma_q}{2}\|x_i - x_j\|^2\right).$$

However, using the techniques described herein, any covariance function may be selected, such as Matern 3/2 or 5/2 with automatic relevance determination, and so on. Thus, the marginal likelihood is obtained by integrating out the function f under the Gaussian Process prior, as in Equation(3) and Equation(4):

$$p(Y \mid X, \theta, \sigma^2) = \int p(Y \mid X, f)p(f \mid X)df$$

$$p(Y \mid X, \theta, \sigma^2) = \prod_{d=1}^{D} \mathcal{N}(y_{:,d} \mid 0, K(X, X) + \sigma^2 \mathbb{I})$$

Because the populated matrix 110 is expected to be a sparsely populated matrix in accordance with one or more implementations, inference calculations are performed to infer workflow performance metrics for cell values that are not populated with recorded performance metrics. Because the marginal likelihood of Equation(4) follows a multivariate Gaussian distribution, marginalizing over the missing performance metrics is performed by dropping the missing performance metrics from the mean and covariance. Stated mathematically, an indexing function is defined as $e(j): \mathbb{N} \rightarrow \mathbb{N}^m$, where j represents a data set index and the indexing function returns a list of m workflows that have been evaluated on j, which correspond to workflow performance metrics recorded in one or more cells of the populated matrix 110. Using this indexing function, Equation(4) can be rewritten as in Equation(5):

$$p(Y \mid X, \theta, \sigma^2) = \prod_{d=1}^{D} \mathcal{N}(y_{e(d),d} \mid 0, K(X_{e(d)}, X_{e(d)}) + \sigma^2 \mathbb{I})$$

From Equation(5), parameters and latent variables can be inferred by minimizing the log-likelihood using stochastic gradient descent. By preserving the entries $Y_{e(j),j}$ one at a time and updating $X_{e(j)}$, θ, and σ for each dataset j, the negative log-likelihood of the model can be written as in Equation(6):

$$L = -const. - \frac{N_j}{2}\log|C_j| - \frac{1}{2}(y_{e(j),j}^T C^{-1} y_{e(j),j})$$

where $C=K(X_{e(d)}, X_{e(d)})+\sigma^2\mathbb{I}$.

For every data set j, which corresponds to one of the multiple data sets 104 as illustrated in FIG. 1, the global parameters θ and the latent variables $X_e(j)$ are updated by evaluating at the t-th iteration, as stated in Equation(7) and Equation(8):

$$\theta^{t+1} = \theta^t - \eta\frac{\partial L}{\partial \theta}$$

$$X_{e(j)}^{t+1} = X_{e(j)}^t - \eta\frac{\partial L}{\partial X_{e(j)}}$$

where η represents a learning rate parameter. Using the techniques described herein, a different learning rate per parameter is allowed (i.e., η is a vector). In order to tune the learning rate parameter at each iteration, an optimizer is then used. Any suitable optimizer may be used, such as the root-mean-square Prop (RmsProp). Thus, a machine learning model can be trained and infer parameters and latent variables for performance metrics not otherwise included in the populated matrix 110.

After training the model, a predicted performance of a workflow 'm' from the multiple workflows 102 can be computed for a new data set 'j' 116 by computing the predictive posterior distribution, as in Equation(9):

$$p(y^*_{m,j} \mid X, \theta, \sigma) = \mathcal{N}(\mu(m), s(m))$$

where μ(m) is defined by Equation(10):

$$\mu(m) = k_{e(j),m}(K_{e(j),e(j)} + \sigma^2\mathbb{I})^{-1}y_{e(j)}$$

and s(m) is defined by Equation(11):

$$s(m) = k_{m,m} + \sigma^2 - k_e^T(j),m(K_{e(j),e(j)} + \sigma^2\mathbb{I})^{-1}k_{e(j),m}$$

Thus, Equation(9) provides a measure of performance for a workflow 'm' as applied to a new data set 'j', represented as a posterior distribution of the predicted performance of the multiple workflows 102. From Equation(9), an acquisition function is used to construct a utility function from the model posterior, which is useable to identify which workflow of the multiple workflows 102 to try next in search of the optimum workflow 118. In implementations, any suitable acquisition function may be used, such as an expected improvement (EI) acquisition function, a probability of improvement (PI) acquisition function, an upper confidence bound (UCB) acquisition function, and so on. For example, using an EI acquisition function, the expected improvement of a different workflow of the multiple workflows 102 is defined as in Equation(12):

$$EI(m) = s(m)[\gamma(m)\Phi(\gamma)(m) + \mathcal{N}(\gamma(m);0,1))]$$

where s(m) is the posterior predictive variance for workflow m, as defined in Equation(11). Φ(m) is the cumulative distribution function (CDF) of the standard normal, and γ(m) is defined as in Equation(13):

$$\gamma(m) = \frac{f(m_{best}) - \mu(m)}{s(m)}$$

where $\mu(m)$ is the posterior predictive mean and $f(m_{best})$ is the performance metric (e.g., AUCROC, runtime, etc.) of the best workflow found thus far. The performance metric $f(m_{best})$ can be iteratively compared against a performance metric threshold to identify an optimum workflow 118 for a new data set 116.

In implementations, this performance metric threshold may be user-specified. For example, if a workflow performance metric is a runtime of the workflow to complete processing on a given data set, a user may specify a maximum runtime threshold such that the optimum workflow 118 is selected as a workflow that does not exceed the maximum runtime threshold. Similarly, a user may specify a minimum runtime threshold such that the optimum workflow 118 is selected as a workflow with a runtime that does not exceed the minimum runtime threshold. This may be performed for any suitable workflow performance metric.

Using the workflow runtime example, because some machine learning workflows are more computationally expensive to evaluate than others, it is useful to predict the running time of multiple workflows 102 such that cheaper ones can be tried first and more expensive ones tried only if cost considerations warrant doing so. In this example, the running time for one or more of the multiple workflows 102 is assessed on different ones of the multiple data sets 104, and the populated matrix 110 is populated to record the measured running times. The running time can then be integrated into the acquisition function to compute an expected improvement per time, such as an expected improvement per second, an expected improvement per minute, and so on.

Furthermore, the techniques described herein enable learning of correlations between different ones of the multiple workflows 102, which is induced by a correlation among the workflows' performance across different ones of the multiple data sets 104 during training and testing. This enables additional data set metadata to be included in the model, which includes meta features, such as a number of samples included in a data set, a number of classes included in a data set, a number of features included in a data set, and so on. This further enables identification of similar data sets based on commonalities between data sets' metadata. Inclusion of this metadata into the covariance function K can be described to include a second covariance as in Equation(14):

$$P(Y|X,\theta,\sigma,M) = \mathcal{N}(0, K_t(X,X) \otimes K_{data-meta}(M,M) + \sigma^2 \mathbb{I})$$

where $M \in \mathbb{R}^{D \times F}$ represents a matrix of meta-features about the multiple data sets 104. Inference of this model thus requires inversion of a covariance matrix of size ND×ND. Examples of workflow metadata can then be incorporated into the model. Examples of workflow metadata can be information about which components are used in a workflow, information about which parameters are used in a workflow, and so on. This workflow metadata can then be incorporated into the model using the covariance function as in Equation(15):

$$p(Y|X,\theta,\sigma,M) = \mathcal{N}(0, K_t(X,X) + K_{workflow-meta}(M,M) + \sigma^2 \mathbb{I})$$

where $M \in \mathbb{R}^{N \times F}$ represents a matrix of meta-features about the multiple workflows 102.

Accordingly, once the model is trained, it can be used to realize a latent space where different workflows 102 are jointly yielded. Given the new data set 116, the performance of different ones of the workflows 102 can be predicted, as well as performance of a hybrid workflow, which includes portions of at least two of the workflows 102, but is not included on its own in the received multiple workflows 102. Vector algebra can be used to discover a combination of workflows that will reach a certain point in the latent space. In implementations, the certain point in the latent space can be designated by a user, such as a user of a computing device implementing the techniques described herein.

Thus, the techniques described herein enable identifying the optimum workflow 118, from the multiple workflows 102, for a new data set 116 based on training and testing a subset of the multiple workflows 102 on a subset of the received data sets 104, using probabilistic matrix factorization.

Figure 2:
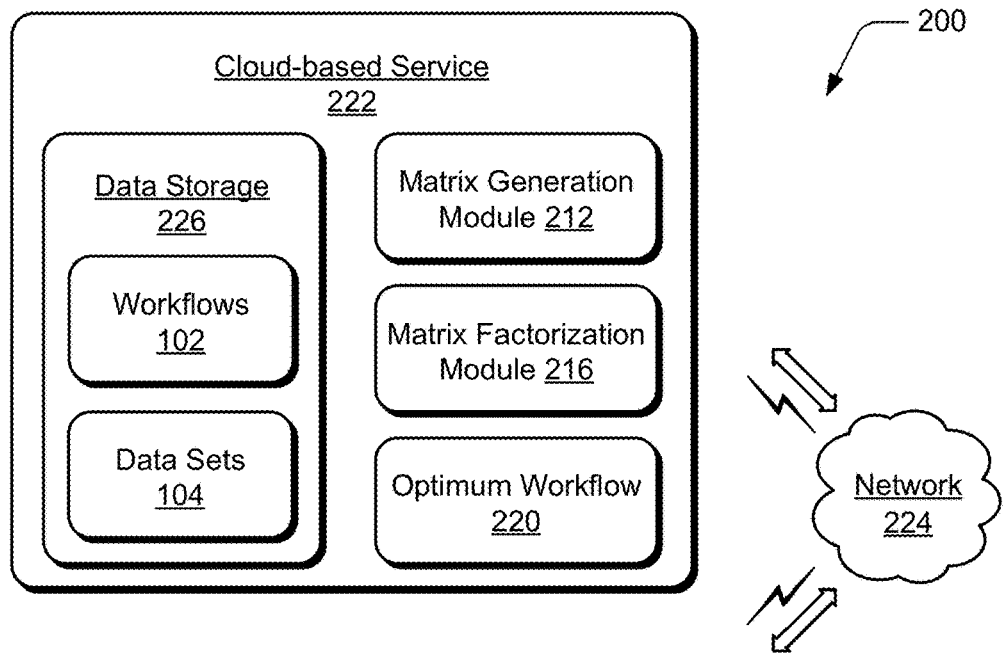
FIG. 2 illustrates an example system in which embodiments of probabilistic matrix factorization for automated machine learning can be implemented.
Figure 2:
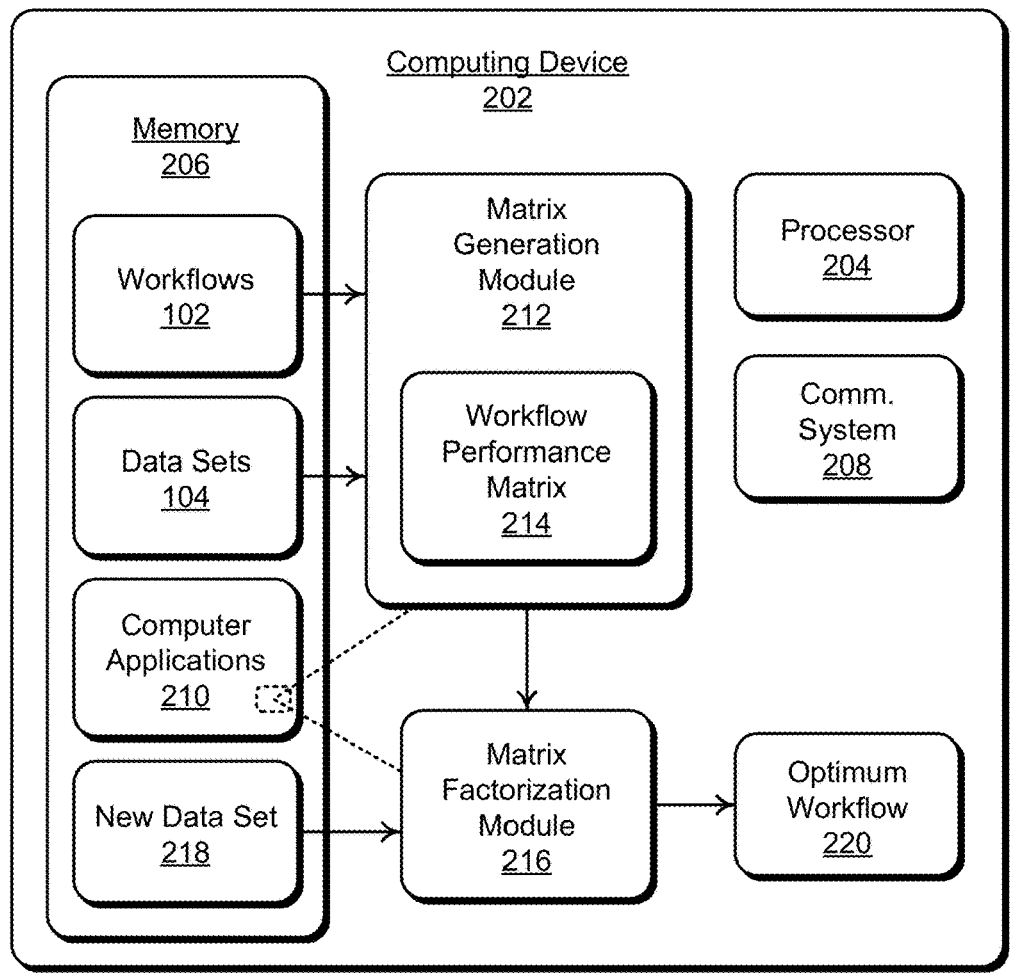

FIG. 2 illustrates an example system 200 in which embodiments of probabilistic matrix factorization for automated machine learning can be implemented. The example system 200 includes a computing device 202, such as a computing device that identifies an optimum workflow 118 for a new data set 114 using the techniques shown and described with reference to FIG. 1. The computing device 202 can be implemented with various components, such as a processor 204 (or processing system) and memory 206, and with any number and combination of different components as further described with reference to the example device shown in FIG. 4. Although not illustrated, the computing device 202 may be implemented as a mobile or portable device and can include a power source, such as a battery, to power the various device components. Further, the computing device 202 can include different wireless ratio systems, such as for Wi-Fi, Bluetooth™, Mobile Broadband, LTE, or any other wireless communication system or format. Generally, the computing device 202 implements a communication system 208 that includes a radio device, antenna, and chipset that is implemented for wireless communication with other devices, networks, and services.

As described herein, the techniques for probabilistic matrix factorization enable identification of an optimum workflow for a new data set based on training and testing of a subset of multiple workflows 102 on a subset of data sets 104. The disclosed techniques enable predicting performance of different workflows on data sets, even if the different workflows have not been tested or trained on the data sets. Further, the disclosed techniques enable identification of an optimum workflow, that comprises a combination of at least two of the multiple workflows, for a new data set.

The computing device 202 includes one or more computer applications 210, such as a matrix generation module 212 to generate a matrix from multiple received workflows 102 and multiple received data sets 104, such as the unpopulated matrix 106 as shown and described with reference to FIG. 1. As described herein, each of the multiple workflows 102 includes one or more preprocessing steps for a machine learning model, the machine learning model itself, and parameters for at least one of the machine learning model or the one or more preprocessing steps. A machine learning model of a workflow may be any machine learning model, such as a deep neural network (DNN), a convolutional neural network (CNN), a random forest, and so on. Different ones of the multiple received data sets 104 may include similar data and may also include data that is not comparable to or congruent with data of another one of the multiple received data sets 104.

The matrix generation module 212 is implemented to train and test a subset of the workflows 102 on a subset of the data sets 104, to generate a workflow performance matrix 214 that is populated with performance metrics of the subset of workflows as applied to the subset of data sets, such as the populated matrix 110 as shown and described with reference to FIG. 1. Workflow performance metrics recorded in the workflow performance matrix 214 may include any suitable performance metric, an accuracy, such as a measure of accuracy for the workflow stated in terms of an area under a receiver operating characteristic curve (AUCROC), a measure of runtime to complete the workflow stated in unit measurements of time, a root mean squared error (RMSE), and so on.

The computer applications 210 also include a matrix factorization module 216 to determine a low-rank decomposition of the workflow performance matrix 214, using the techniques describe herein. In implementations, the low-rank decomposition of the workflow performance matrix 214 is performed using a probabilistic non-linear low-rank decomposition. Alternatively, the low-rank decomposition of the workflow performance matrix 214 is performed using dimensionality reduction techniques based on Gaussian processes. Using the low-rank decomposition of the workflow performance matrix 214, the matrix factorization module 216 is configured to receive a new data set 218 and output an optimum workflow 220 for the new data set. The optimum workflow 220 is determined using an acquisition function and can either represent one of the multiple received workflows 102 or represent a hybrid combination of at least two of the multiple received workflows 102, using the techniques described herein.

In implementations, the optimum workflow 220 is determined based on an expected improvement of a workflow relative to an expected improvement threshold. Alternatively or additionally, the optimum workflow 220 may be determined based on a probability of improvement of the workflows relative to a probability of improvement threshold. Alternatively or additionally, the optimum workflow 220 may be determined based on an expected improvement per unit of time of the workflow relative to a threshold expected improvement per unit of time. The matrix factorization module 216 is additionally configured to identify two or more dissimilar workflows from the low-rank decomposition of the workflow performance matrix 214 and include the two or more dissimilar workflows in a stacked ensemble for subsequent testing on a different data set.

The matrix factorization module 216 can apply the optimum workflow 220 to the new data set 218 and provide measured performance metrics of the workflow along with data identifying the optimum workflow 220 and the new data set 218 to the matrix generation module 212. Upon receiving data from the matrix factorization module 216, the matrix generation module 212 can update the workflow performance matrix 214 with additional rows, columns, and performance metric values in a cell corresponding to the optimum workflow 220 and the new data set 218. In implementations, the new data set 218 is received by the matrix factorization module 216 from the memory 206 of the computing device 202. Alternatively or additionally, the new data set 218 may be received from a source that is remote to the computing device 202, such as from a cloud-based service 222 via a network 224.

The example system 200 includes the cloud-based service 222, which is accessible by client devices, to include the computing device 202. The cloud-based service 222 includes data storage 226 that may be implemented as any suitable memory, memory device, or electronic data storage for network-based storage. The data storage 226 can maintain the multiple workflows 102 and the multiple data sets 104. Although not illustrated, the data storage 226 can additionally maintain at least one new data set 218 to be used by the matrix factorization module 216 to determine the optimum workflow 220. The cloud-based service 222 can implement an instance of the matrix generation module 212 to generate the workflow performance matrix 214 from the workflows 102 and the data sets 104. The workflow performance matrix 214 that is generated by the instance of the matrix generation module 212 can be used by an instance of the matrix factorization module 216 implemented by the cloud-based service. The instance of the matrix factorization module 216 can compute a low-rank decomposition of the workflow performance matrix 214 and use the low-rank decomposition to determine an optimum workflow 220 for the new data set 218. Instances of the matrix generation module 212 and the matrix factorization module 216 can be hosted by the cloud-based service 222 as network-based applications that are accessible by a computer application 210 from the computing device 202.

The cloud-based service 222 can also be implemented with server devices that are representative of one or multiple hardware server devices of the service. Further, the cloud-based service 222 can be implemented with various components, such as a processing system and memory, as well as with any number and combination of different components as further described with reference to the example device shown in FIG. 4 to implement the services, applications, servers, and other features of probabilistic matrix factorization for automated machine learning. In embodiments, aspects of probabilistic matrix factorization for automated machine learning as described herein can be implemented by the matrix generation module 212 and the matrix factorization module 216 at the cloud-base service and/or may be implemented in conjunction with the matrix generation module 212 and the matrix factorization module 216 that are implemented by the computing device 202.

The example system 200 also includes the network 224, and any of the devices, servers, and/or services described herein can communicate via the network, such as for data communication between the computing device 202 and the cloud-based service 222. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments, the matrix generation module 212 receives multiple workflows 102 and multiple data sets 104. The matrix generation module 212 then generates the workflow performance matrix 214 from the received workflows 102 and the data sets 104. Subsets of the workflows 102 are trained and tested on subsets of the data sets 104 to measure and record workflow performance metrics in cells of the workflow performance matrix 214. The matrix factorization module 216 then determines a low-rank decomposition of the sparsely populated workflow performance matrix 214. From this low-rank decomposition, the matrix factorization module 216 iteratively determines which one or more of the workflows 102 is an optimum workflow 220 for a new data set 218. The matrix factorization module 216 is then able to apply the optimum workflow 220 to the new data set 218, and provide measured performance metrics to the matrix generation module 212 for inclusion in the workflow performance matrix 214, thereby iteratively improving a speed of convergence to identifying the optimum workflow 220 for a subsequent new data set 218.

Example method 300 is described with reference to FIG. 3 in accordance with one or more embodiments of probabilistic matrix factorization for automated machine learning. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
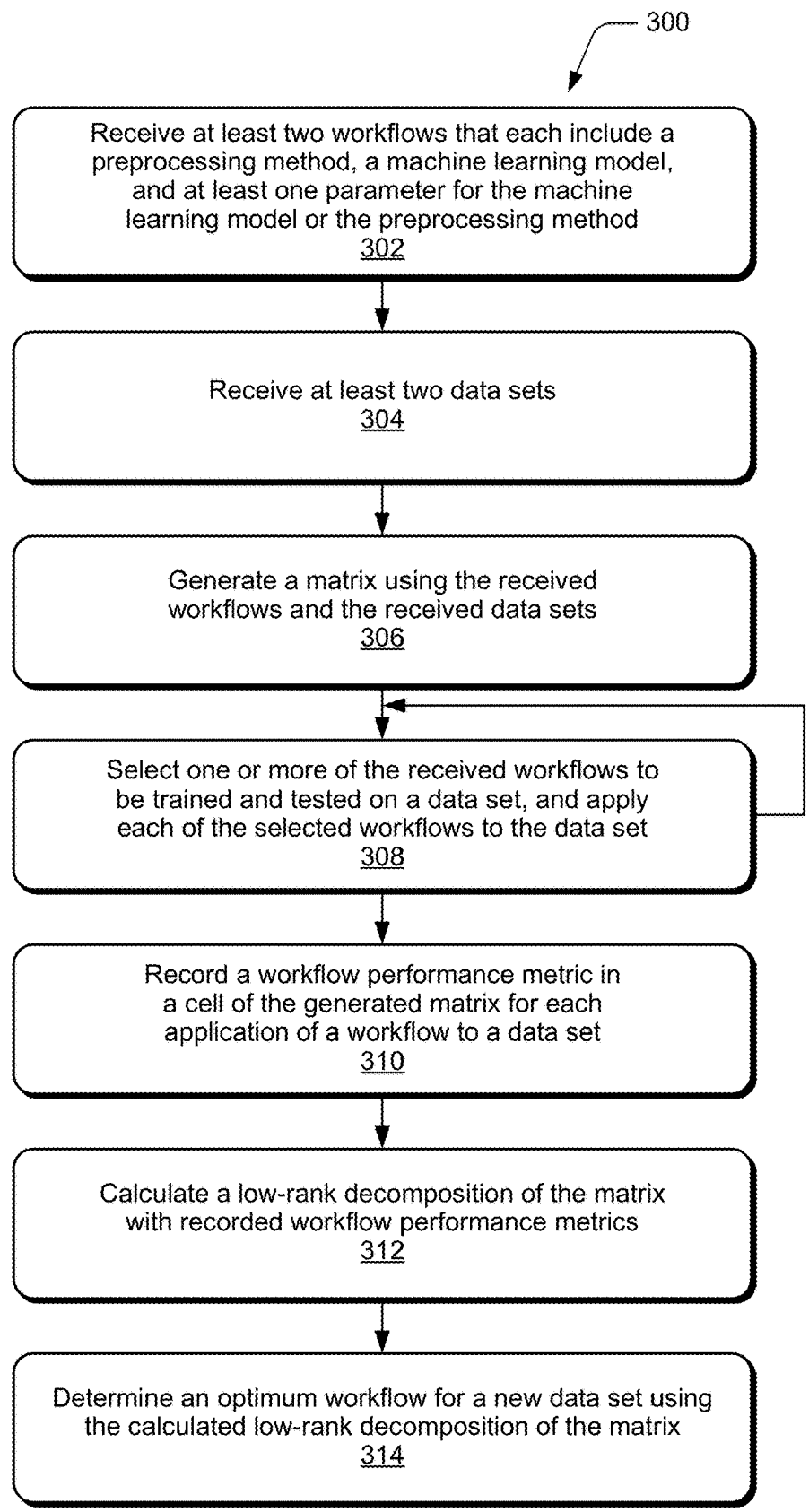
FIG. 3 illustrates example method(s) of probabilistic matrix factorization for automated machine learning in accordance with one or more embodiments.

FIG. 3 illustrates an example method(s) 300 of the probabilistic matrix factorization for automated machine learning techniques discussed herein, and is generally described with reference to FIGS. 1 and 2. The order in which the method is described is not intended to be construed as a limitation, and any number or combination of the method operations can be performed in any order to implement a method, or an alternate method.

At 302, at least two workflows are received that each include a preprocessing method, a machine learning model, and at least one parameter for the machine learning model or the preprocessing method. For example, the matrix generation module 212 receives the multiple workflows 102, where each of the workflows includes a preprocessing method of one or more preprocessing steps for a machine learning model, the machine learning model, and at least one parameter for the machine learning model or the one or more preprocessing steps. The machine learning model of a workflow 102 may be any suitable type of machine learning model, such as a deep neural network (DNN), a convolutional neural network (CNN), a random forest, and so on. The parameter for the machine learning model may include any suitable parameter, such as a number of leaves of a tree structure, a depth of the tree structure, a number of latent factors in a matrix factorization, a learning rate, a number of hidden layers in a DNN, and so on. The parameter for one of the one or more preprocessing steps may be any suitable parameter, such as a formatting parameter, a cleaning parameter, a sampling parameter, and so on. Thus, the combination of preprocessing steps for a machine learning model, the machine learning model, and the parameter for at least one of the machine learning model or preprocessing steps represents a unique combination for a workflow 102 that is not found in different ones of the other received workflows.

At 304, at least two data sets are received. For example, multiple data sets 104 may be received. For example, the matrix generation module 212 receives the data sets 104, where each of the data sets includes any type of information, such as an album of pictures. Individual ones of the received data sets 104 may include data that is similar to other ones of the received data sets. Alternatively or additionally, the received data sets can be diverse and vary with respect to one another, such that data of one received data set is not generally comparable to or congruent with data of another received data set. For example, one data set 104 may be an album of pictures, another data set may be quarterly sales figures for a business, and so on.

At 306, a matrix is generated using the received workflows and the received data sets. For example, the matrix generation module 212 generates the unpopulated matrix 106 using the received workflows 102 and received data sets 104. In implementations, the unpopulated matrix may be a workflow performance matrix 214 as generated by the matrix generation module 212. The matrix is generated using the workflows 102 and that data sets 104 such that each row of the matrix represents a different workflow and each column of the matrix represents a different data set. Thus, dimensions of the generated matrix can be stated as a number of workflows-by-a number of data sets matrix. Upon generation, individual cells of the unpopulated matrix 106 are not populated with data, or are populated to include null data values.

At 308, one or more of the received workflows are selected to be trained and tested on a data set, and applied to a data set of the received data sets. For example, the matrix generation module 212 applies one or more selected workflows 102 to the data set 104 for training and testing each selected workflow on the data set to measure a workflow performance metric. In implementations, applying the one or more selected workflows 102 to a data set 104 is performed by the matrix generation module 212, and the selection of the workflows can be repeated for additional data sets, as indicated by the recursive arrow at 308.

For each additional data set, the selected workflows 102 may be the same as, or vary from, the workflows that were selected for a previous data set. A number of data sets 104 for which the received workflows 102 are selected may be specified by a user, such as a user of computing device 202. Alternatively or additionally, the number of data sets 104 for which the received workflows 102 are selected may be a pre-specified number, or specified as a percentage of an overall number of data sets included in the received data sets 104. Similarly, a number of the workflows 102 selected to be applied to each data set 104 may be specified by a user, may be a pre-specified number, may be a percentage of an overall number of workflows in the received workflows 102, and the like.

At 310, for each workflow applied to a data set, a workflow performance metric is recorded in a corresponding cell of the generated matrix. For example, the matrix generation module 212 records workflow performance metrics in the unpopulated matrix 106 to produce the populated matrix 110. In implementations, the workflow performance metrics are recorded by the matrix generation module 212 in the workflow performance matrix 214. The recorded performance metric for a workflow 102 may be any quantifiable measure of a workflow's performance when applied to a data set 104, such as the workflow's accuracy stated in terms of an accuracy, an area under a receiver operating characteristic curve (AUCROC), a measure of a runtime to apply the workflow to the data set stated in units of time, a root mean squared error (RMSE), and so on. In implementations, the workflow performance metrics are recorded to generate a sparsely populated matrix, where performance metrics for one or more combinations of a workflow and a data set are unknown.

At 312, a low-rank decomposition of the matrix with the recorded performance metrics is calculated. For example, the matrix factorization module 216 calculates a low-rank decomposition of the populated matrix 110. In implementations, the low-rank decomposition of the workflow performance matrix 214 is calculated by the matrix factorization module 216, and the low-rank decomposition may be calculated using any suitable technique, such as using a probabilistic non-linear low-rank decomposition. Alternatively or additionally, the low-rank decomposition of the matrix may be calculated using other techniques, such as dimensionality reduction techniques based on Gaussian processes and the like.

At 314, an optimum workflow for a new data set is determined using the calculated low-rank decomposition of the matrix. For example, the matrix factorization module 216 determines an optimum workflow 118 for the new data set 116 using the low-rank decomposition by identifying the optimum workflow from a predicted performance 114 of the multiple workflows 102 being applied to the new data set. In implementations, the matrix factorization module 216 determines the optimum workflow 220 for the new data set 218. The new data set may be a data set from the received data sets 104 or may be a data set not included in the received data sets. The optimum workflow 220 is determined by iteratively considering different ones of the received workflows relative to a threshold value. For example, the optimum workflow may be determined based on an expected improvement of the workflow relative to an expected improvement threshold. Alternatively, the optimum workflow may be determined based on a probability of improvement of the workflow relative to a probability of improvement threshold. Alternatively, the optimum workflow may be determined based on an expected improvement per unit of time of the workflow, relative to an expected improvement per unit of time threshold. The threshold against which the optimum workflow is selected may be user-specified or may be pre-specified using the techniques described herein.

The optimum workflow 220 can be determined using an acquisition function, and the optimum workflow can correspond to one of the multiple received workflows 102 or can correspond to a hybrid combination of two or more of the received workflows, such that the optimum workflow is a newly discovered workflow. From this analysis and the low-rank decomposition of the matrix, the techniques described herein are able to identify two or more dissimilar workflows to be combined in a stacked ensemble for subsequent testing on one or more of the data sets 104. The optimum workflow 220 is then applied to the new data set 218 and performance metrics from the application are recorded. In implementations, this performance metric, optimum workflow, and new data set can be added to the workflow performance matrix 214 by the matrix generation module 212, thereby providing additional information against which a subsequent optimum workflow can be determined for a subsequent new data set. Thus, the method(s) 300 can identify an optimum workflow for a new data set while mitigating an amount of workflows that need to be trained and tested on different data sets.

Figure 4:
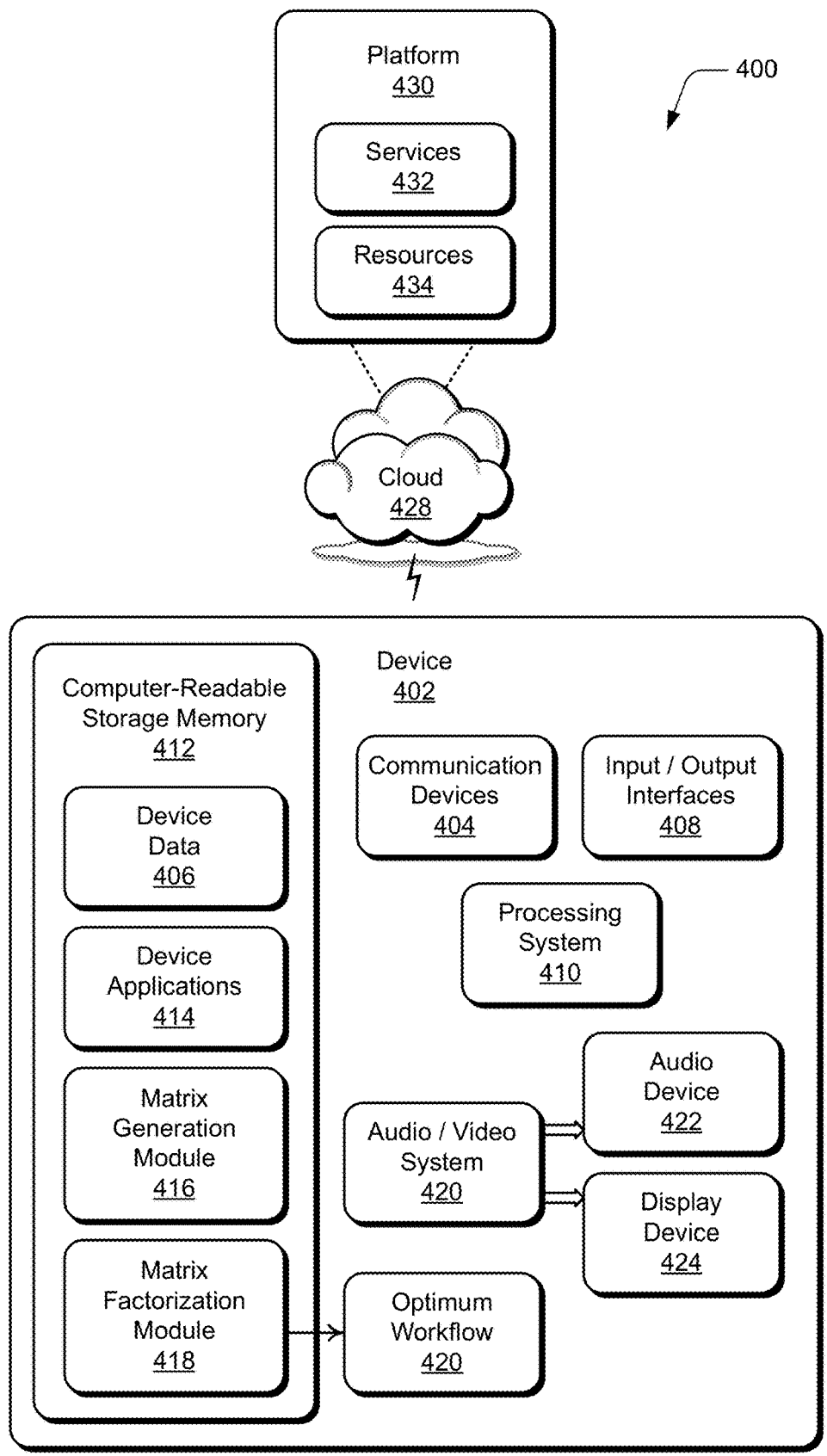
FIG. 4 illustrates an example system with an example device that can implement embodiments of probabilistic matrix factorization for automated machine learning.

FIG. 4 illustrates an example system 400 that includes an example device 402, which can implement probabilistic matrix factorization for automated machine learning using the techniques described herein. The example device 402 can be implemented as any of the computing devices, user devices, and server devices described with reference to the previous FIGS. 1-3, such as any type of mobile device, wearable device, client device, mobile phone, tablet, computing, communication, entertainment, gaming, media playback, and/or other type of device. For example, the computing devices described herein may be implemented as the example device 402 or with various components of the example device.

The device 402 includes communication devices 404 that enable wired and/or wireless communication of device data 406, such as one or more received workflows and one or more received data sets. Additionally, the device data can include any type of audio, video, and/or image data. The communication devices 404 can also include transceivers for cellular phone communication and for network data communication.

The device 402 also includes input/output (I/O) interfaces 408, such as data network interfaces that provide connection and/or communication links between the device, data networks, and other devices described herein. The I/O interfaces can be used to couple the device to any type of components, peripherals, and/or accessory devices. For example, the I/O interfaces can be used to couple the device to measurement instruments that are useable to measure and record data sets for use in generating a workflow performance matrix using the techniques described herein. The I/O interfaces also include data input ports via which any type of data, media content, and/or inputs can be received, such as user inputs to the device, as well as any type of audio, video, and/or image data received from any content and/or data source.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The device 402 also includes a computer-readable storage memory 412, such as data storage devices that can be accessed by a computing device, and that provide persistent storage of data and executable instructions (e.g., software applications, programs, functions, modules, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 412 provides storage of the device data 406 and various device applications 414, such as an operating system that is maintained as a software application with the computer-readable storage memory and executed by the processing system 412. In this example, the device applications include a matrix generation module 416 and a matrix factorization module 418 that implement embodiments of the probabilistic matrix factorization techniques described herein with reference to FIGS. 1-3, and are useable to generate one or more optimum workflows 420 (e.g., stored as device data 406 in the computer-readable storage memory 412).

The device 402 also includes an audio and/or video system 422 that generates audio data for an audio device 424 and/or generates display data for a display device 426. The audio device and/or the display device include any devices that process, display, and/or otherwise render audio, video, display, and/or image data. In implementations, the audio device and/or the display device are integrated components of the example device 402. Alternatively, the audio device and/or the display device are external, peripheral components to the example device.

In embodiments, at least part of the probabilistic matrix factorization for automated machine learning techniques may be implemented in a distributed system, such as over a "cloud" 428 in a platform 430. The cloud 428 includes and/or is representative of the platform 430 for services 432 and/or resources 434. The platform 430 abstracts underlying functionality of hardware, such as server devices (e.g., included in the services 432) and/or software resources (e.g., included as the resources 434), and connects the example device 402 with other devices, servers, etc. The resources 434 may also include applications and/or data that can be utilized while computer processing is executed on servers that are remote from the example device 402. Additionally, the services 432 and/or the resources 434 may facilitate subscriber network services, such as over the Internet, a cellular network, or Wi-Fi network. The platform 430 may also serve to abstract and scale resources to service a demand for the resources 434 that are implemented via the platform, such as in an interconnected device embodiment with functionality distributed throughout the system 400. For example, the functionality may be implemented in part at the example device 402 as well as via the platform 430 that abstracts the functionality of the cloud.

Although embodiments of probabilistic matrix factorization for automated machine learning have been described in language specific to features and/or methods, the appended claims are not necessarily limited to the specific features or methods described. Rather, the specific features and methods are disclosed as example implementations of probabilistic matrix factorization for automated machine learning techniques, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A computing system implemented for probabilistic matrix factorization, the system comprising: memory configured to maintain different data sets and different workflows for use in probabilistic matrix factorization for automated machine learning; a processor system to implement a matrix generation module and a matrix factorization module, the matrix generation module configured to: generate a populated matrix using at least two of the different workflows and at least two of the different data sets; select a subset of the different data sets and for each data set in the selected subset: apply one or more of the different workflows to the data set, the one or more different workflows selected to be trained and tested on the data set; and record a workflow performance metric for each of the selected one or more different workflows applied to the data set, the workflow performance metric recorded in a cell of the populated matrix; the matrix factorization module configured to: calculate a low-rank decomposition of the populated matrix with the workflow performance metrics; and determine, for a new data set, an optimum workflow using the calculated low-rank decomposition of the populated matrix.

Alternatively or in addition to the above described computing system, any one or combination of: each of the different workflows comprises one or more preprocessing steps for a machine learning model, the machine learning model, and at least one parameter for the machine learning model or the one or more preprocessing steps. The combination of the preprocessing steps, the machine learning model, and the at least one parameter of a workflow differs from a combination of the preprocessing steps, the machine learning model, and the at least one parameter of the other different workflows. The at least one parameter for the machine learning model comprises one or more of a number of leaves of a tree structure, a depth of the tree structure, a number of latent factors in a matrix factorization, a learning rate, or a number of hidden layers in a deep neural network (DNN). The machine learning model comprises one of a deep neural network (DNN), a convolutional neural network (CNN), or a random forest. Individual ones of the different data sets include data that is not comparable to or congruent with data of other ones of the different data sets. The workflow performance metric is an accuracy of the workflow applied to the data set. The workflow performance metric is a runtime of the different workflow applied to the data set. Each row of the populated matrix corresponds to one of the different workflows and each column of the populated matrix corresponds to one of the different data sets. The low-rank decomposition of the populated matrix is calculated using a probabilistic non-linear low-rank decomposition. The low-rank decomposition of the populated matrix is calculated using dimensionality reduction techniques based on Gaussian processes. The optimum workflow comprises a workflow that provides a maximum performance metric, among the received workflows, for the new data set. The optimum workflow is a hybrid workflow comprising a combination of at least two of the different workflows. The optimum workflow is determined based on an expected improvement of the optimum workflow relative to an expected improvement threshold. The optimum workflow is determined based on a probability of improvement of the optimum workflow relative to a probability of improvement threshold. The optimum workflow is determined based on an expected improvement per unit of time of the optimum workflow relative to an expected improvement per unit of time threshold. The matrix generation module is further configured to identify, from the low-rank decomposition of the populated matrix, a combination of two or more workflows that will reach a designated point in a latent space in which the different workflows and the different data sets can be jointly yielded. The matrix factorization module is further configured to apply the optimum workflow to the new data set, record a performance metric resulting from the application of the optimum workflow to the new data set, and update the populated matrix to include data corresponding to the performance metric resulting from the application of the optimum workflow to the new data set.

A method comprising: generating a matrix using at least two different data sets to define columns of the matrix and at least two different workflows to define rows of the matrix, each of the different workflows comprising one or more preprocessing steps for a machine learning model, the machine learning model, and at least one parameter for the machine learning model or the one or more preprocessing steps; selecting a subset of the different data sets and for each data set in the subset of data sets: selecting one or more of the different workflows to be trained and tested on the data set; applying the selected one or more workflows to the data set; and generating a populated matrix by recording a workflow performance metric for each workflow applied to the data set in a cell of the generated matrix; calculating a low-rank decomposition of the populated matrix; and determining, for a new data set, an optimum workflow using the calculated low rank decomposition of the populated matrix, the optimum workflow comprising one of the different workflows that provides a maximum performance metric for the new data set.

A computer-readable storage memory comprising stored instructions that are executable and, responsive to execution of the stored instructions by a computing system, the computing system performs operations comprising: generating a matrix using at least two different data sets to define columns of the matrix and at least two different workflows to define rows of the matrix, each of the different workflows comprising one or more preprocessing steps for a machine learning model, the machine learning model, and at least one parameter for the machine learning model or the one or more preprocessing steps; selecting a subset of the different data sets and for each data set in the subset of data sets: selecting one or more of the different workflows to be trained and tested on the data set; applying the selected one or more workflows to the data set; and generating a populated matrix by recording a workflow performance metric for each workflow applied to the data set in a cell of the generated matrix; calculating a low-rank decomposition of the populated matrix; and determining, for a new data set, an optimum workflow using the calculated low rank decomposition of the populated matrix, the optimum workflow comprising one of the different workflows that provides a maximum performance metric for the new data set.

The invention claimed is:

1. A computing system implemented for probabilistic matrix factorization, the system comprising:
   memory configured to maintain different data sets and different workflows for use in probabilistic matrix factorization for automated machine learning;
   a processor system to implement a matrix generation module and a matrix factorization module,
   the matrix generation module configured to:
   generate a populated matrix using at least two of the different workflows and at least two of the different data sets;
   select a subset of the different data sets and for each data set in the selected subset:
   apply one or more of the different workflows to the data set, the one or more different workflows selected to be trained and tested on the data set; and
   record a workflow performance metric for each of the selected one or more different workflows applied to the data set, the workflow performance metric recorded in a cell of the populated matrix;
   the matrix factorization module configured to:
   calculate a low-rank decomposition of the populated matrix with the workflow performance metrics; and
   determine, for a new data set, a hybrid workflow using the calculated low-rank decomposition of the populated matrix, the hybrid workflow including a combination of portions of at least two of the different workflows, corresponding predicted performances of the at least two different workflows determined based on the low-rank decomposition, a predicted performance of the hybrid workflow determined by interpolating between the corresponding predicted performances, and the hybrid workflow not included in either of the populated matrix of the at least two different workflows.

2. The computing system as recited in claim 1, wherein each of the different workflows comprises one or more preprocessing steps for a machine learning model, the machine learning model, and at least one parameter for the machine learning model or the one or more preprocessing steps.

3. The computing system as recited in claim 2, wherein a combination of the preprocessing steps, the machine learning model, and the at least one parameter of a workflow differs from a combination of the preprocessing steps, the machine learning model, and the at least one parameter of the other different workflows.

4. The computing system as recited in claim 2, wherein the at least one parameter for the machine learning model comprises one or more of a number of leaves of a tree structure, a depth of the tree structure, a number of latent factors in a matrix factorization, a learning rate, or a number of hidden layers in a deep neural network (DNN).

5. The computing system as recited in claim 2, wherein the machine learning model comprises one of a deep neural network (DNN), a convolutional neural network (CNN), or a random forest.

6. The computing system as recited in claim 1, wherein individual ones of the different data sets include data that is not comparable to or congruent with data of other ones of the different data sets.

7. The computing system as recited in claim 1, wherein the workflow performance metric is an accuracy of workflow of the workflows applied to the data set.

8. The computing system as recited in claim 1, wherein the workflow performance metric is a runtime of the different workflows applied to the data set.

9. The computing system as recited in claim 1, wherein each row of the populated matrix corresponds to one of the different workflows and each column of the populated matrix corresponds to one of the different data sets.

10. The computing system as recited in claim 1, wherein the low-rank decomposition of the populated matrix is calculated using a probabilistic non-linear low-rank decomposition.

11. The computing system as recited in claim 1, wherein the low-rank decomposition of the populated matrix is calculated using dimensionality reduction techniques based on Gaussian processes.

12. The computing system as recited in claim 1, wherein the hybrid workflow comprises a workflow that provides a maximum performance metric, among the selected workflows, for the new data set.

13. The computing system as recited in claim 1, wherein the hybrid workflow is determined based on an expected improvement of the hybrid workflow relative to an expected improvement threshold.

14. The computing system as recited in claim 1, wherein the hybrid workflow is determined based on a probability of improvement of the hybrid workflow relative to a probability of improvement threshold.

15. The computing system as recited in claim 1, wherein the hybrid workflow is determined based on an expected improvement per unit of time of hybrid workflow relative to an expected improvement per unit of time threshold.

16. The computing system as recited in claim 1, wherein the matrix factorization module is further configured to apply the hybrid workflow to the new data set, record a performance metric resulting from the application of the hybrid workflow to the new data set, and update the populated matrix to include data corresponding to the performance metric resulting from the application of the hybrid workflow to the new data set.

17. A method, comprising:

generating a matrix using at least two different data sets to define columns of the matrix and at least two different workflows to define rows of the matrix, each of the different workflows comprising one or more preprocessing steps for a machine learning model, the machine learning model, and at least one parameter for the machine learning model or the one or more preprocessing steps;

selecting a subset of the different data sets and for each data set in the subset of data sets:

selecting one or more of the different workflows to be trained and tested on the data set;

applying the selected one or more workflows to the data set; and generating a populated matrix by recording a workflow performance metric for each workflow applied to the data set in a cell of the generated matrix;

calculating a low-rank decomposition of the populated matrix; and determining, for a new data set, a hybrid workflow using the calculated low-rank decomposition of the populated matrix, the hybrid workflow comprising one of the different workflows that provides a maximum performance metric for the new data set the hybrid workflow including a combination of portions of at least two of the different workflows, corresponding predicted performances of the at least two different workflows determined based on the low-rank decomposition, a predicted performance of the hybrid workflow determined by interpolating between the corresponding predicted performances, and the hybrid workflow not included in either of the populated matrix of the at least two different workflows.

18. A non-transitory computer-readable storage memory comprising stored instructions that are executable and, responsive to execution of the stored instructions by a computing system, the computing system performs operations comprising:

generating a matrix using at least two different data sets to define columns of the matrix and at least two different workflows to define rows of the matrix, each of the different workflows comprising one or more preprocessing steps for a machine learning model, the machine learning model, and at least one parameter for the machine learning model or the one or more preprocessing steps;

selecting a subset of the different data sets and for each data set in the subset of data sets:

selecting one or more of the different workflows to be trained and tested on the data set;

applying the selected one or more workflows to the data set; and generating a populated matrix by recording a workflow performance metric for each workflow applied to the data set in a cell of the generated matrix;

calculating a low-rank decomposition of the populated matrix; and determining, for a new data set, a hybrid workflow using the calculated low-rank decomposition of the populated matrix, the hybrid workflow comprising one of the different workflows that provides a maximum performance metric for the new data set, the hybrid workflow including a combination of portions of at least two of the different workflows, corresponding predicted performances of the at least two different workflows determined based on the low-rank decomposition, a predicted performance of the hybrid workflow determined by interpolating between the corresponding predicted performances, and the hybrid workflow not included in either of the populated matrix of the at least two different workflows.

* * * * *